(12) United States Patent
Han et al.

(10) Patent No.: US 12,371,003 B2
(45) Date of Patent: Jul. 29, 2025

(54) APPARATUS OF HYBRID VEHICLE AND METHOD THEREOF

(71) Applicants: Hyundai Motor Company, Seoul (KR); Kia Corporation, Seoul (KR)

(72) Inventors: Dong Hee Han, Seongnam-si (KR); Jong Il Park, Seoul (KR); Hyunjin Kang, Hwaseong-si (KR); Heechang Oh, Seongnam-si (KR); Jonghyeok Lee, Hwaseong-si (KR); Kwanhee Lee, Suwon-si (KR); Jaeheun Kim, Pyeongtaek-si (KR); JaUn Ku, Suwon-si (KR); Seungwoo Hong, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 310 days.

(21) Appl. No.: 17/900,034

(22) Filed: Aug. 31, 2022

(65) Prior Publication Data

US 2023/0202458 A1 Jun. 29, 2023

(30) Foreign Application Priority Data

Dec. 29, 2021 (KR) .................. 10-2021-0191405

(51) Int. Cl.
*B60W 20/16* (2016.01)
*B60W 10/02* (2006.01)
(Continued)

(52) U.S. Cl.
CPC ............ *B60W 20/40* (2013.01); *B60W 10/06* (2013.01); *B60W 10/08* (2013.01); *B60W 2510/0619* (2013.01); *B60W 2710/0666* (2013.01)

(58) Field of Classification Search
CPC ......... Y02T 10/62; Y02T 10/72; Y02T 10/64; Y02T 10/40; Y02T 90/40; Y02T 70/5236;
(Continued)

(56) References Cited

U.S. PATENT DOCUMENTS

| 2003/0217877 A1 | 11/2003 | Tatara et al. |
| 2011/0174256 A1* | 7/2011 | Aso ................. F02D 41/062 123/179.4 |

(Continued)

FOREIGN PATENT DOCUMENTS

| DE | 10 2016 204 936 A1 | 9/2017 |
| DE | 10 2018 122 543 A1 | 3/2020 |

OTHER PUBLICATIONS

Extended European Search Report issued in corresponding European Patent Application No. 22192808.8 dated Feb. 28, 2023.

*Primary Examiner* — Khoi H Tran
*Assistant Examiner* — Alyse Tramanh Tran
(74) *Attorney, Agent, or Firm* — MORGAN, LEWIS & BOCKIUS LLP

(57) ABSTRACT

A hybrid vehicle may include: an engine including a plurality of cylinders for generating power required for driving the hybrid vehicle by combustion of fuel; a first motor starting the engine and selectively operating as a generator to generate electrical energy; a second motor generating power required for driving the hybrid vehicle; a clutch provided between the engine and the second motor; and a controller configured for synchronizing a velocity of the second motor and an engine velocity and for coupling the clutch, in a transition section in which the engine moves from a stop state to an optimal operation point area as an operation area of the engine, and gradually decreasing a torque of the second motor and gradually adjusting the number of combusted cylinders among the plurality of
(Continued)

combustion chambers to gradually increase the engine torque.

14 Claims, 7 Drawing Sheets

(51) Int. Cl.
*B60W 10/06* (2006.01)
*B60W 10/08* (2006.01)
*B60W 20/40* (2016.01)
*B60W 30/18* (2012.01)
*F02D 41/00* (2006.01)
*F02D 41/14* (2006.01)
*F02P 5/15* (2006.01)

(58) Field of Classification Search
CPC ...... B60W 10/08; B60W 10/06; B60W 20/00; B60W 10/02; B60W 20/40; B60W 2710/083; B60W 2540/10; B60W 20/10; B60W 20/15; B60W 2710/0666; B60W 2710/0644; B60W 2510/0638; B60W 10/30; B60W 2710/081; B60W 2710/021; B60W 2510/083; B60W 2510/0657; B60W 2710/08; B60W 2710/027; B60W 2710/06; B60W 2710/105; B60W 2030/206; B60W 2510/0241; B60W 2710/0616; B60W 2510/0275; B60W 2710/0622; B60W 2710/065; B60W 30/18; B60W 2710/0627; B60W 2710/085; B60W 2510/08; B60W 2710/1022; B60W 2710/023; B60W 2510/105; B60W 2510/0623; B60W 2540/14; B60W 2510/0642
See application file for complete search history.

(56) References Cited

U.S. PATENT DOCUMENTS

2015/0258976 A1\* 9/2015 Takahashi ............. B60W 10/10 903/945
2019/0202438 A1\* 7/2019 Park ...................... B60W 20/40
2022/0306072 A1\* 9/2022 Fukao .................... B60K 6/387

\* cited by examiner

APPARATUS OF HYBRID VEHICLE AND METHOD THEREOF

CROSS-REFERENCE TO RELATED APPLICATION

The present application claims priority to Korean Patent Application No. 10-2021-0191405 filed on Dec. 29, 2021, the entire contents of which is incorporated herein for all purposes by this reference.

BACKGROUND OF THE PRESENT DISCLOSURE

Field of the Present Disclosure

The present disclosure relates to an apparatus of controlling a hybrid vehicle and a method thereof, and more particularly, to a method for controlling a hybrid vehicle and a method thereof which can enhance efficiency of an engine and reduce discharge of nitrogen oxide (NOx) in a transition section in which the engine moves from a stop state to an optimal operation area.

Description of Related Art

A hybrid vehicle as a vehicle of an intermediate stage of a vehicle using an internal combustion engine and an electric vehicle is a vehicle that utilizes two or more power sources, such as the power of an engine and the power of a battery.

The hybrid vehicle may have various structures by use of two or more power sources constituted by the engine and a motor.

As one example of the hybrid vehicle, a powertrain apparatus of a transmission mounted electric device (TMED) scheme in which a driving motor and a transmission, and a driveshaft are connected in series may be used.

A clutch is provided between the engine and the driving motor, and the hybrid vehicle is operated in an electric vehicle (EV) mode or a hybrid electric vehicle (HEV) mode according to the clutch being coupled.

The EV mode is a mode in which a vehicle is driven only with driving force of the motor and the HEV mode is a mode in which the vehicle is driven with the driving force of the motor and the engine.

Because the driving motor assists the power of the engine in the hybrid vehicle, the engine applied to the hybrid vehicle operates mainly at a maximum thermal efficiency operation point (or optimal operation point). When low-temperature combustion is implemented by use of a lean burn combustion mode at the maximum thermal efficiency operation point, a combustion temperature is lowered, and as a result, a specific heat ratio increases, which enhance efficiency of the hybrid vehicle.

However, because technical constraints of the combustion system development are large to operate all operating areas of the engine in the lean burn combustion mode, the engine may be operated in a theoretical air-fuel ratio mode except for the maximum thermal efficiency operation point.

However, in the hybrid vehicle, switching of the EV mode and the HEV mode frequently occurs, and the operation of the engine is stopped in an idle state or when the vehicle is decelerated. Accordingly, a case where the engine is stopped and operates at the optimal operation point while the vehicle is driven repeatedly frequently occurs.

In a transition section in which the engine is stopped and moves to the optimal operation point, an engine speed synchronizes with a driving motor speed, and the clutch is coupled. Furthermore, a torque of the engine is gradually increased to a target torque, and the torque of the driving motor is gradually decreased, so an input-side torque of the transmission is controlled to reach a final torque required for driving.

Such a process is referred to as torque blending. When the torque of the engine is increased in the torque blending process, the engine is operated in the theoretical air-fuel ratio mode, and as a result, a large amount of nitrogen oxide (NOx) is generated.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a hybrid vehicle which can enhance efficiency of an engine and reduce discharge of nitrogen oxide in a transition section in which the engine moves from a stop state to an optimal operation point area in which the engine operates in a lean burn combustion mode.

Various aspects of the present disclosure are directed to providing a hybrid vehicle including: an engine including a plurality of cylinders for generating power required for driving the hybrid vehicle by combustion of fuel; a first motor starting the engine, and selectively operating as a generator to generate electrical energy; a second motor generating power required for driving the hybrid vehicle; a clutch provided between the engine and the second motor; and a controller configured for synchronizing a velocity of the second motor and an engine velocity and for coupling the clutch, in a transition section in which the engine moves from a stop state to an optimal operation point area as an operation area of the engine, and gradually decreasing a torque of the second motor and gradually adjusting the number of combusted cylinders among the plurality of combustion chambers to gradually increase the engine torque.

The number of combusted cylinders in the transition section may be increased stepwise whenever a set engine cycle elapses.

The torque of the second motor in the transition section may be reduced as a ratio of the number of combusted cylinders increased whenever the set engine cycle elapses to a total number of cylinders.

The cylinder of the engine may operate in a lean burn combustion mode in the transition section.

An air-fuel ratio in the transition section may be set to be different from the air-fuel ratio in the optimal operation point area.

The air-fuel ratio of the engine in the optimal operation point area may be set to be greater than the air-fuel ratio of the engine in the transition section.

An engine torque output from a combusted cylinder may be gradually increased by adjusting an ignition time of the engine during the set engine cycle.

The ignition time of the engine may be gradually advanced during the set engine cycle.

Various aspects of the present disclosure are directed to providing a method for controlling a hybrid vehicle, including: in a transition section in which an engine moves from a stop state to an optimal operation point area as an operation area of the engine, increasing a velocity of the engine through power of a first motor and synchronizing the velocity of the engine with a velocity of a second motor; when the velocity of the engine is synchronized with the velocity of the second motor, coupling a clutch provided between the engine and the second motor; and when the clutch is coupled, gradually increasing a torque of the engine and gradually decreasing the torque of the second motor to output a final torque input into a transmission, in which in the outputting of the final torque, the torque of the engine may be gradually increased by adjusting the number of combusted cylinders among a plurality of combustion chambers of the engine.

The number of combusted cylinders in the transition section may be increased stepwise whenever a set engine cycle elapses.

The torque of the second motor in the transition section may be reduced at a ratio of the number of combusted cylinders to a total number of cylinders whenever the set engine cycle elapses.

The cylinder of the engine may operate in a lean burn combustion mode in the transition section.

An air-fuel ratio in the transition section may be set to be different from the air-fuel ratio in the optimal operation point area.

The air-fuel ratio of the engine in the optimal operation point area may be set to be greater than the air-fuel ratio of the engine in the transition section.

An engine torque output from a combusted cylinder may be gradually increased by adjusting an ignition time of the engine during the set engine cycle.

The ignition time of the engine may be gradually advanced during the set engine cycle.

According to various exemplary embodiments of the present disclosure, by a hybrid vehicle, discharge of nitrogen oxide may be minimized and unnecessary fuel consumption may be reduced in a transition section in which an engine moves from a stop state to an optimal operation point area.

Furthermore, in the transition section, as an engine torque continuously increases, vibration or shock generated from the engine is minimized, and as a result, the shock applied to a power transmission system of a vehicle may be minimized.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
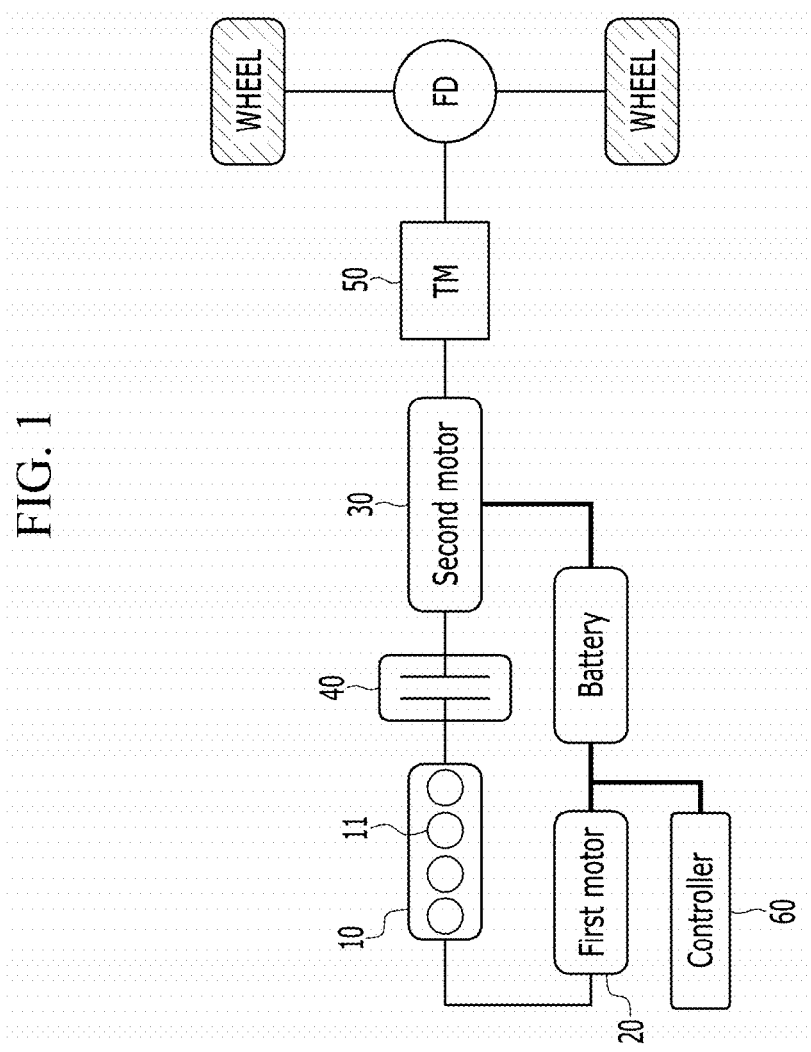
FIG. 1 is a conceptual view exemplarily illustrating a configuration of a hybrid vehicle according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Exemplary embodiments of the present disclosure will be described more fully hereinafter with reference to the accompanying drawings, in which exemplary embodiments of the present disclosure are shown. As. As those skilled in the art would realize, the described embodiments may be modified in various different ways, all without departing from the spirit or scope of the present disclosure.

The drawings and description are to be regarded as illustrative in nature and not restrictive, and like reference numerals designate like elements throughout the specification.

Furthermore, since size and thickness of each component illustrated in the drawings are arbitrarily represented for convenience in explanation, the present disclosure is not limited to the illustrated size and thickness of each component and the thickness is enlarged and illustrated in order to clearly express various parts and areas.

Hereinafter, a hybrid vehicle according to various exemplary embodiments of the present disclosure will be described in detail with reference to the accompanying drawings.

The hybrid vehicle according to the exemplary embodiment of the present disclosure described below will be described by taking a structure of a transmission mounted electric device (TMED) scheme as an ex. However, the scope of the present disclosure is not limited thereto, and the present disclosure may also be applied to other schemes of hybrid vehicles, of course.

FIG. 1 is a conceptual view exemplarily illustrating a configuration of a hybrid vehicle according to various exemplary embodiments of the present disclosure.

As illustrated in FIG. 1, the hybrid vehicle according to the exemplary embodiment of the present disclosure may include an engine 10, a first motor 20, a second motor 30, a clutch 40, and a controller 60.

The engine 10 includes a plurality of cylinders 11 for generating power required for driving the hybrid vehicle by combustion of fuel. In the exemplary embodiment of the present disclosure, the engine 10 may be a gasoline engine 10. Furthermore, the engine 10 according to the exemplary embodiment of the present disclosure may be a 4-cylinder engine, a 3-cylinder engine 10, or a 6-cylinder engine 10, and the scope of the present disclosure is not limited according to the number of cylinders of the engine 10.

The first motor 20 may start the engine 10 and as necessary, selectively operates as a generator to generate electrical energy. The first motor 20 may be a kind of starter and generator.

The second motor 30 generates the power required for driving the vehicle, and assists the power of the engine 10 as necessary. Furthermore, the second motor 30 selectively operates as the generator to generate the electrical energy.

The clutch 40 is provided between the engine 10 and the second motor 30, and the hybrid vehicle is driven in an electric vehicle (EV) mode or a hybrid electric vehicle (HEV) mode according to the clutch 40 being coupled.

A mode in which the vehicle is driven only by the power of the second motor 30 is the electric vehicle (EV) mode and a mode in which the vehicle is driven by the power of the engine 10 and the power of the second motor 30 is a hybrid electric vehicle (HEV) mode.

The power outputted from the engine 10 and the second motor 30 is transmitted to a driving wheel provided in the vehicle though final drive (FD). In the instant case, the transmission 50 is provided between the clutch 40 and the driving wheel.

A transmission gear is embedded in the transmission 50, and the power outputted from the engine 10 and the second motor 30 is changed according to a transmission gear stage.

The controller 60 is configured to control components of the hybrid vehicle, which include the engine 10, the first motor 20, the second motor 30, and the clutch 40. Furthermore, the controller 60 is configured to control to synchronize a velocity of the second motor 30 and an engine velocity in a transition section in which the engine 10 moves from a stop state to an optimal operation point area as an operation area of the engine 10, and then decrease a torque of the second motor 30 and increase the torque of the engine 10, and output a final torque input into the transmission 50.

To the present end, the controller 60 may be provided as one or more processors which operate by a set program and the set program may be configured to perform each step of a method for controlling the hybrid vehicle according to the exemplary embodiment of the present disclosure.

Hereinafter, an operation of the hybrid vehicle according to the exemplary embodiment of the present disclosure will be described in detail with reference to the accompanying drawings.

Figure 2:
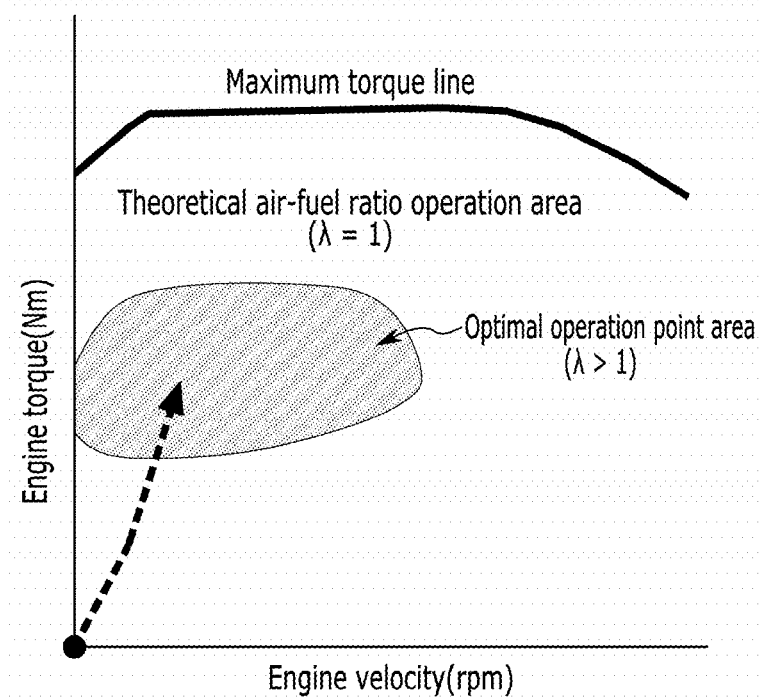
FIG. 2 is a graph illustrating an operating area of an engine applied to the hybrid vehicle according to various exemplary embodiments of the present disclosure.

FIG. 2 is a graph illustrating an operating area of an engine applied to the hybrid vehicle according to the exemplary embodiment of the present disclosure.

Referring to FIG. 2, the operating area of the engine 10 applied to the hybrid vehicle according to the exemplary embodiment of the present disclosure may be divided into the optimal operation point area and a remaining area other than the optimal operation point area.

In the optimal operation point area, the engine 10 operates in a lean burn combustion mode (air-fuel ratio $\lambda>1$) and in the remaining operation area (theoretical air-fuel ratio operation area) other than the optimal operation point area, the engine 10 operates in a theoretical air-fuel ratio mode (air-fuel ratio $\lambda=1$).

Figure 3:
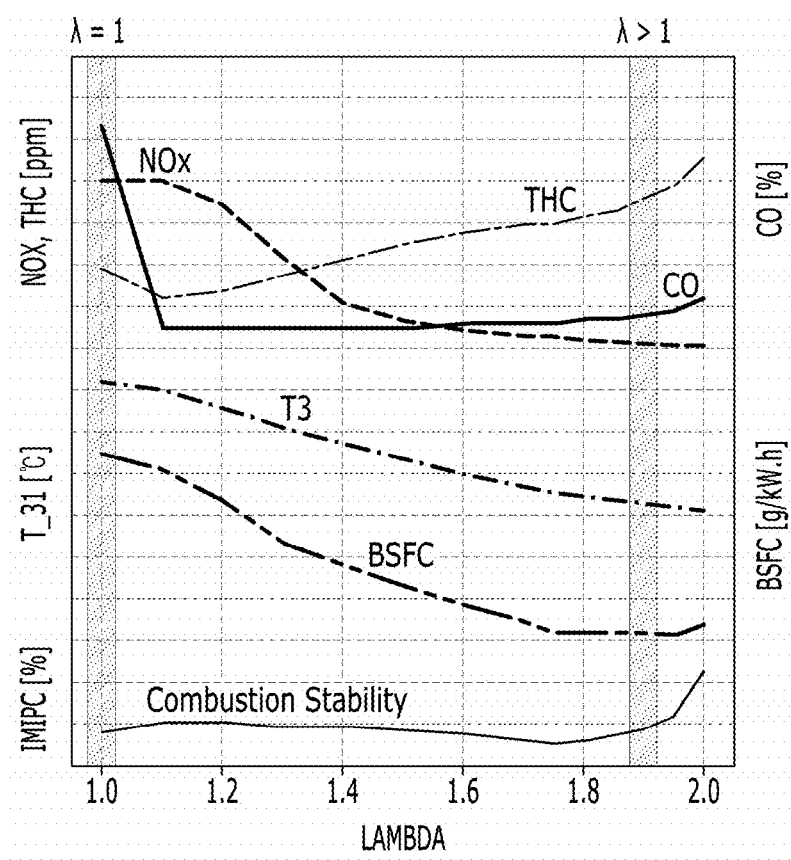
FIG. 3 is a graph illustrating combustion characteristics of the engine applied to the hybrid vehicle according to various exemplary embodiments of the present disclosure.

Accordingly, when the engine 10 is operated in the lean burn combustion mode in the optimal operation point area, there are characteristics of high thermal efficiency (or low Brake-Specific Fuel Consumption (BSFC)) and very low nitrogen oxide being discharged as compared with the case where the engine 10 is operated at the theoretical air-fuel ratio (see FIG. 3).

However, when the hybrid vehicle is switched from the EV mode to the HEV mode, the start of the engine 10 is stopped and the engine 10 is restarted or the engine 10 is idle-stopped and restarted according to the operation of an idle stop and go (ISG) system or when the vehicle is decelerated and accelerated, the start of the engine 10 is stopped and the engine 10 is restarted.

Accordingly, when the area in which the engine 10 is operated in the lean burn combustion mode is limited to the optimal operation point area, the engine 10 is stopped and restarted and the transition section frequently occurs in which the operation area of the engine 10 moves to the optimal operation point area.

According to an exemplary embodiment of the present disclosure, in the transition section, efficiency of the engine 10 is enhanced, and the discharge of the nitrogen oxide is reduced, and in a torque blending process, a continuous final toque input into the transmission 50 is outputted.

Figure 4:
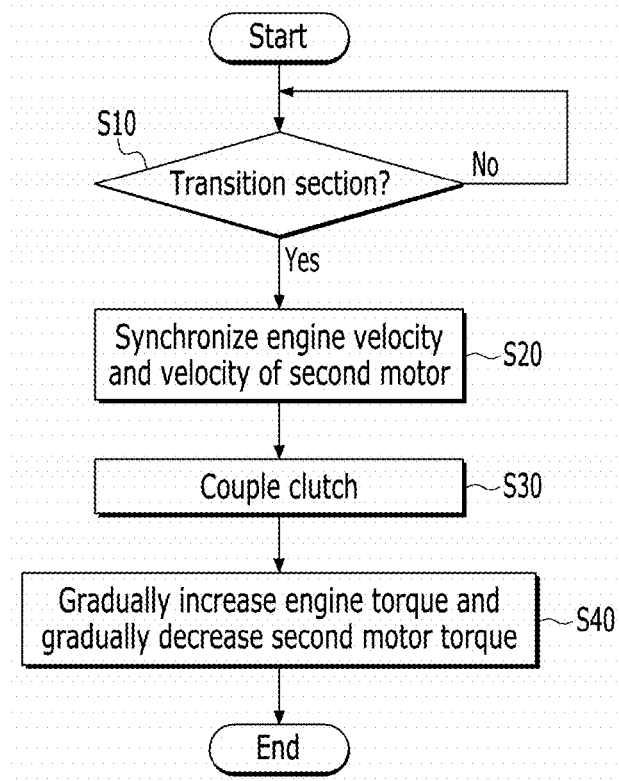
FIG. 4 is a flowchart illustrating a method for controlling a hybrid vehicle according to various exemplary embodiments of the present disclosure.

FIG. 4 is a flowchart illustrating a method for controlling a hybrid vehicle according to various exemplary embodiments of the present disclosure.

As illustrated in FIG. 4, in a transition section (S10) in which the engine 10 is stopped, and then started, and the operation area of the engine 10 moves to the optimal operation point area, the controller 60 synchronizes the velocity of the second motor 30 with the engine velocity (S20).

In the instant case, the controller 60 synchronizes the engine velocity with the velocity of the second motor 30 by increasing the engine velocity through the power of the first motor 20.

When the velocity of the second motor 30 is synchronized with the engine velocity, the controller 60 couples the clutch 40 (S30).

When the clutch 40 is coupled, the controller 60 gradually decreases the torque of the second motor 30 and gradually increases the number of combusted cylinders 11 among the plurality of combustion chambers to gradually increase the engine torque (S40). A sum of an engine torque and the torque of the second motor 30 becomes the final torque input into the transmission 50. Here, a section in which the engine torque is increased and the torque of the second motor 30 is decreased to maintain the final torque input into the transmission constantly is referred to as a torque blending section.

When the engine torque is gradually increased, the controller 60 increases the number of combusted cylinders 11 stepwise whenever a set engine cycle elapses.

For example, in the case of the 4-cylinder engine, when the clutch 40 is coupled, one cylinder 11 is combusted during the set engine cycle (e.g., an engine cycle of 3 times or 4 times), when the set engine cycle (e.g., the engine cycle of 3 times or 4 times) elapses, two cylinders 11 are combusted, when the set engine cycle (e.g., the engine cycle of 3 times or 4 times) elapses, three cylinders 11 are combusted, and when the set engine cycle (e.g., the engine cycle of 3 times or 4 times) elapses, four cylinders 11 are combusted.

For example, in the case of the 6-cylinder engine, when the clutch 40 is coupled, one cylinder 11 is combusted during the set engine cycle (e.g., an engine cycle of 3 times or 4 times), and when the set engine cycle (e.g., the engine cycle of 3 times or 4 times) elapses, two cylinders 11 are combusted, when the set engine cycle (e.g., the engine cycle of 3 times or 4 times) elapses, three cylinders 11 are combusted, when the set engine cycle (e.g., the engine cycle of 3 times or 4 times) elapses, four cylinders 11 are combusted, when the set engine cycle (e.g., the engine cycle of 3 times or 4 times) elapses, five cylinders 11 are combusted, and when the engine cycle last set (e.g., the engine cycle of 3 times or 4 times) elapses, six cylinders 11 are combusted.

Alternatively, in the case of the 6-cylinder engine, when the clutch 40 is coupled, two cylinders 11 may be combusted during the set engine cycle (e.g., an engine cycle of 3 times or 4 times), when the set engine cycle (e.g., the engine cycle of 3 times or 4 times) elapses, four cylinders 11 may be combusted, and when the set engine cycle (e.g., the engine cycle of 3 times or 4 times) elapses, six cylinders 11 may be combusted.

The number of cylinders 11 increased whenever the set engine cycle elapses may be appropriately determined according to a need of a designer.

Accordingly, when number of combusted cylinders 11 increases stepwise whenever the set engine cycle elapses, the torque output from the engine 10 increases stepwise in the torque blending section. For example, in the case of the 4-cylinder engine, when the number of combusted cylinders 11 in the torque blending section increases one by one whenever the set engine cycle elapses, the engine torque output from the engine 10 increases stepwise by ¼ each.

As necessary, in the case of the 6-cylinder engine, when the number of combusted cylinders 11 in the torque blending section increases one by one whenever the set engine cycle elapses, the engine torque output from the engine 10 increases stepwise by ⅙ each and when the number of combusted cylinders 11 increases two by two whenever the set engine cycle elapses, the engine torque output from the engine 10 increases stepwise by ⅓ each.

Furthermore, the motor torque output from the second motor 30 reduces the motor torque stepwise whenever the set engine cycle elapses so that the final torque input into the transmission 50 is maintained constantly.

That is, the motor torque output from the second motor 30 in the transition section is reduced as a ratio of the number of combusted cylinders increased whenever the set engine cycle elapses to a total number of cylinders.

For example, in the case of the 4-cylinder engine, when the number of combusted cylinders 11 in the torque blending section increases one by one whenever the set engine cycle elapses, the motor torque output from the second motor 30 may decrease by ¼ each of an initial motor torque.

Alternatively, in the case of the 6-cylinder engine, when the number of combusted cylinders 11 in the torque blending section increases one by one whenever the set engine cycle elapses, the motor torque output from the second motor 30 may decrease by ⅙ each of the initial motor torque.

Accordingly, the final torque which is the sum of the engine torque output from the engine 10 and the motor torque output from the second motor 30 is constantly output.

In the transition section, the cylinder 11 of the engine 10 is operated in the lean burn combustion mode. In the instant case, the air-fuel ratio of the engine 10 is set to be greater than the theoretical air-fuel ratio so that the engine 10 operates in the lean burn combustion mode. The controller 60 may determine an air amount for satisfying the air-fuel ratio for the engine 10 to operate in the lean burn combustion mode, and control a throttle valve, a boosting apparatus (e.g., a turbocharger, an electric supercharger, etc.), a continuously variable valve timing apparatus (CVVT), etc, to supply an air amount for the engine 10 to operate in the lean burn combustion to the cylinder 11.

Meanwhile, because a composition of exhaust gas discharged in the transition section in which all cylinders 11 of the engine 10 are not combusted and the composition of the exhaust gas discharged in the optimal operation point area in which all cylinders 11 of the engine 10 are combusted may be different, when an air amount for reaching the air-fuel ratio for performing lean burn combustion at the optimal operation point is supplied to the cylinder 11 in the transition section, there may be a difference between the air-fuel ratio of the cylinder 11 in the transition section and the air-fuel ratio at the optimal operation point.

For example, in a transition section in which only some cylinders 11 are combusted, in respect to a temperature of residual gas which flows backward to the inside of the cylinder 11 or a recirculated exhaust gas amount (when differently expressed, EGR gas), the temperature of the residual gas or the EGR gas amount in the optimal operation point area in which all cylinders 11 are combusted is different. Here, the residual gas means exhaust gas which flows backward to the inside of the cylinder 11, in which all exhaust gas generated from the cylinder 11 is not discharged to an exhaust system.

That is, the temperature of the residual gas which flows backward in the optimal operation point area in which all cylinders 11 are combusted may be higher than the temperature of the residual gas which flows backward in the transition section, and the EGR gas amount in the optimal operation point area in which all cylinders 11 are combusted may be greater than the EGR gas amount in the transition section.

Accordingly, because the composition of the exhaust gas in the transition section is different from the composition of the exhaust gas in the optimal operation point area, when the air amount supplied to the cylinder 11 in the transition section is set to be equal to the air amount supplied to the cylinder 11 in the optimal operation point area, there may be a difference between the air-fuel ratio for implementing the lean burn combustion mode in the transition section and a set air-fuel ratio.

Figure 5:
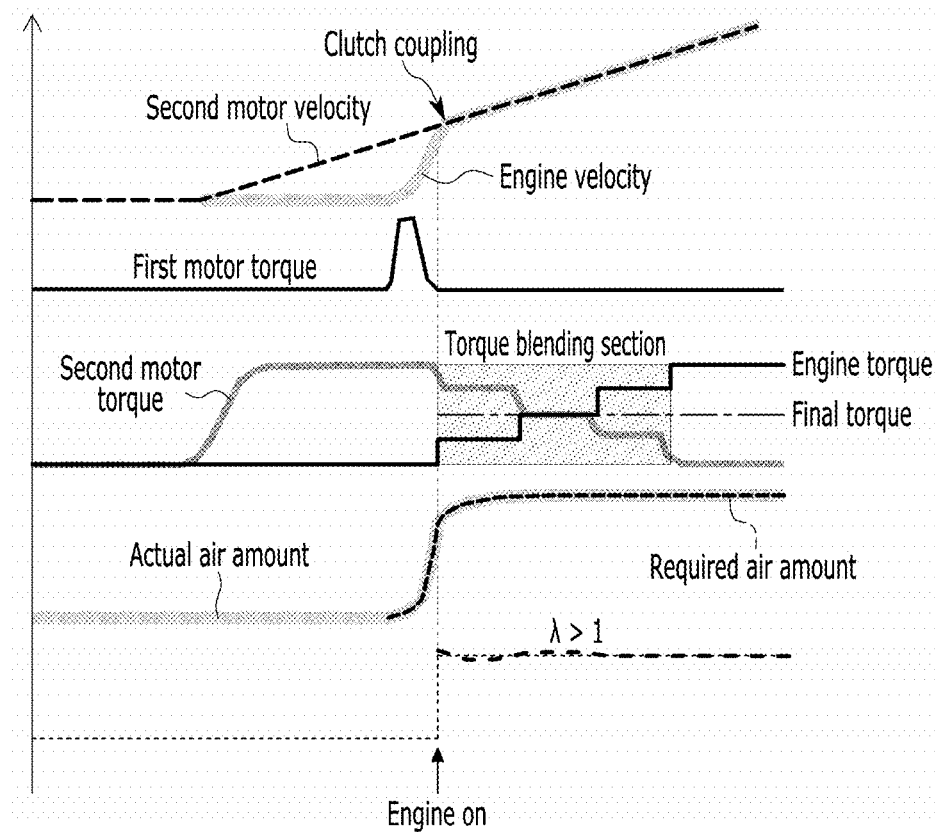
FIG. 5 is a graph for describing an operation of the hybrid vehicle according to various exemplary embodiments of the present disclosure.

Accordingly, as illustrated in FIG. 5, the air-fuel ratio in the transition section and the air-fuel ratio in the optimal operation point area are set to be different, and as a result, the air amount supplied to the cylinder 11 in the transition section is set to made to be different from the air amount supplied to the cylinder 11 in the optimal operation point area. Therefore the air-fuel ratio in the transition section may be equal to the air-fuel ratio in the optimal operation point area.

Figure 6:
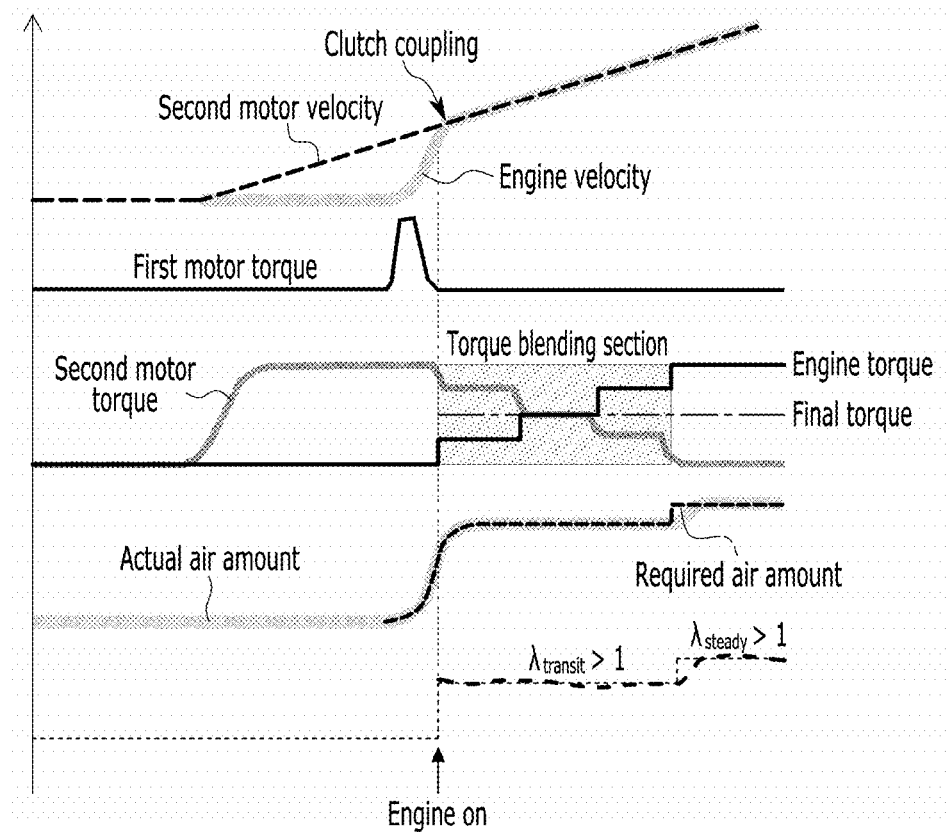
FIG. 6 is a graph for describing the operation of the hybrid vehicle according to various exemplary embodiments of the present disclosure.

In the instant case, the air-fuel ratio $\lambda_{transit}$ in the transition section may be set to be lower than the air-fuel ratio $\lambda_{steady}$ in the optimal operation point area (see FIG. 6).

Furthermore, the controller 60 may adjust an ignition time of the engine 10 during the set engine cycle to continuously output the engine torque in the torque blending section as possible.

When number of combusted cylinders 11 increases stepwise whenever the set engine cycle elapses in the transition section, the torque output from the engine 10 increases stepwise. For example, in the case of the 4-cylinder engine, the engine torque increases by 25% each until reaching the optimal operation point area.

The ignition time may be gradually advanced during the set engine cycle so that the engine torque may increase continuously and gently as possible.

Figure 7:
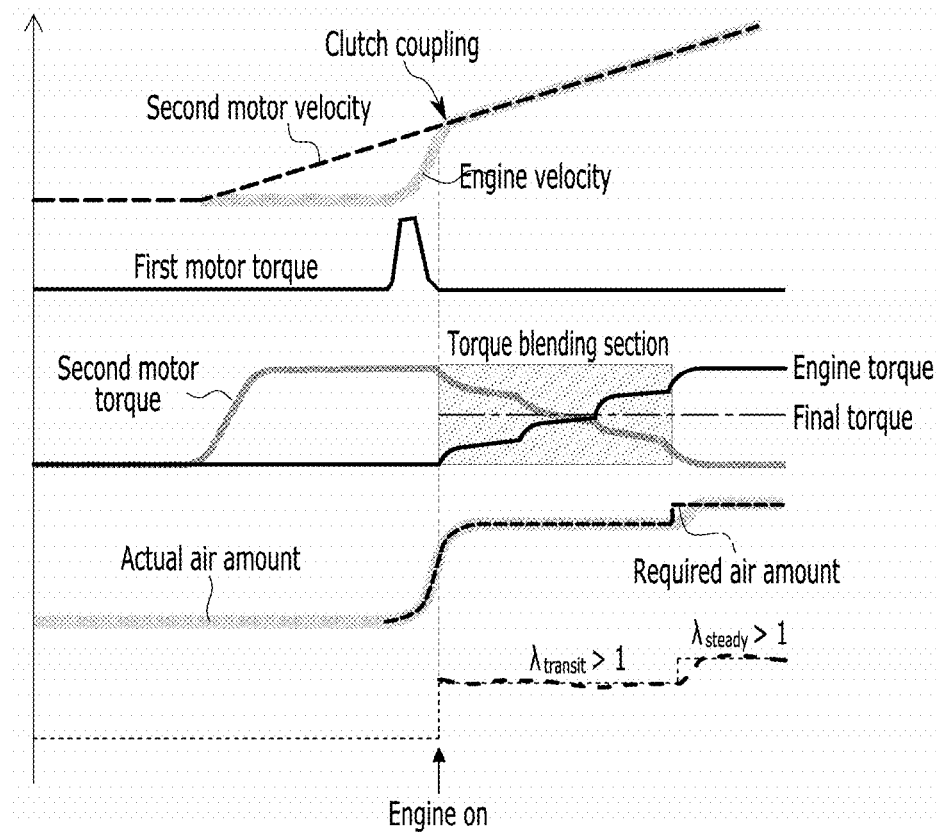
FIG. 7 is a graph for describing the operation of the hybrid vehicle according to various exemplary embodiments of the present disclosure.

For example, referring to FIG. 7, when one cylinder 11 is combusted during the engine cycle of 4 times, if the ignition time is gradually advanced whenever the engine cycle increases by each one time, the engine torque output from one cylinder 11 gradually increases (see 'torque blending section' of FIG. 7).

Furthermore, when two cylinders 11 are combusted during the engine cycle of 4 times, if the ignition time is gradually advanced whenever the engine cycle increases by each one time, the engine torques output from two cylinders 11 gradually increase.

Accordingly, by gradually advancing the ignition time during the set engine cycle, the engine torque output during the set engine cycle may gradually increase and the engine torque may be continuously output in the torque blending section.

As described above, the hybrid vehicle and the control method thereof according to the exemplary embodiments of the present disclosure have been described by taking the 4-cylinder engine as an example. However, the scope of the present disclosure is not limited thereto, and the hybrid vehicle and the control method thereof may also be applied to the 3-cylinder engine 10 or the 6-cylinder engine 10, and the number of cylinders of the engine 10 may be appropriately changed and applied according to the designer.

As referred to as above, by the hybrid vehicle and the control method thereof according to the exemplary embodiments of the present disclosure, because the cylinder 11 combusted in the transition section in which the engine 10 is stopped and moves to the optimal operation point area of operating in the lean burn combustion mode operates in the lean burn combustion mode, the discharge of the nitrogen oxide may be minimized.

Furthermore, because the engine is not operated at the theoretical air-fuel ratio, but operates in the lean burn combustion mode in the transition section, unnecessary fuel consumption may be reduced.

Furthermore, by increasing the number of combusted cylinders 11 stepwise in the transition section, the output of the engine 10 in the transition section continuously increases, and as a result, vibration and shock generated from the engine 10 are minimized, minimizing the shock applied to a power transmission system of the vehicle.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A hybrid vehicle comprising:
an engine including a plurality of cylinders for generating power required for driving the hybrid vehicle by combustion of fuel;
a first motor starting the engine and selectively operating as a generator to generate electrical energy;
a second motor generating power required for driving the hybrid vehicle;
a clutch provided between the engine and the second motor; and
a controller configured for, in a transition section in which the engine moves from a stop state to an optimal operation point area as an operation area of the engine, synchronizing a velocity of the second motor and an engine velocity and for coupling the clutch,
wherein, in a torque blending section in which an engine torque is increased and a torque of the second motor is decreased to maintain a final torque input into a transmission constantly, the controller increases stepwise a number of combusted cylinders whenever a set engine cycle elapses, and decreases stepwise the torque output from the second motor whenever the set engine cycle elapses.

2. The hybrid vehicle of claim 1, wherein the torque of the second motor in the transition section is reduced as a ratio of the number of the combusted cylinders increased whenever the set engine cycle elapses to a total number of cylinders.

3. The hybrid vehicle of claim 1, wherein the cylinders of the engine operate in a lean burn combustion mode in the transition section.

4. The hybrid vehicle of claim 3, wherein an air-fuel ratio in the transition section is set to be different from an air-fuel ratio in the optimal operation point area.

5. The hybrid vehicle of claim 4, wherein the air-fuel ratio of the engine in the optimal operation point area is set to be greater than the air-fuel ratio of the engine in the transition section.

6. The hybrid vehicle of claim 1, wherein the engine torque output from the combusted cylinders among the cylinders is increased by adjusting an ignition time of the engine during the set engine cycle.

7. The hybrid vehicle of claim 6, wherein the ignition time of the engine is advanced during the set engine cycle.

8. A method for controlling a hybrid vehicle, the method comprising:
in a transition section in which an engine moves from a stop state to an optimal operation point area as an operation area of the engine, increasing, by a controller, a velocity of the engine through power of a first motor and synchronizing, by the controller, the velocity of the engine with a velocity of a second motor;
when the velocity of the engine is synchronized with the velocity of the second motor, coupling, by the controller, a clutch provided between the engine and the second motor; and
when the clutch is coupled, increasing, by the controller, a torque of the engine and decreasing, by the controller, a torque of the second motor to constantly output a final torque input into a transmission,
wherein, in a torque blending section in which an engine torque is increased and the torque of the second motor is decreased to maintain the final torque input into the transmission constantly, a number of combusted cylinders is increased stepwise whenever a set engine cycle elapses, and the torque output from the second motor is reduced stepwise whenever the set engine cycle elapses.

9. The method of claim 8, wherein the torque of the second motor in the transition section is reduced as a ratio of the number of the combusted cylinders to a total number of cylinders whenever the set engine cycle elapses.

10. The method of claim 8, wherein the cylinders of the engine operate in a lean burn combustion mode in the transition section.

11. The method of claim 10, wherein an air-fuel ratio in the transition section is set to be different from an air-fuel ratio in the optimal operation point area.

12. The method of claim 11, wherein the air-fuel ratio of the engine in the optimal operation point area is set to be greater than the air-fuel ratio of the engine in the transition section.

13. The method of claim 8, wherein the torque of the engine output from the combusted cylinders among the cylinders is increased by adjusting an ignition time of the engine during the set engine cycle.

14. The method of claim 13, wherein the ignition time of the engine is advanced during the set engine cycle.

* * * * *